V. M. HARRIS.
FILM MAGAZINE FOR CAMERAS.
APPLICATION FILED JUNE 14, 1918.

1,318,552.

Patented Oct. 14, 1919.

Witnesses:
Andrew Wintworn
Earl F. Pierce

Inventor
Varian M. Harris
By Williams, Bradbury &
Attys

UNITED STATES PATENT OFFICE.

VARIAN M. HARRIS, OF CHICAGO, ILLINOIS, ASSIGNOR TO KLIX MANUFACTURING COMPANY, OF CHICAGO, ILLINOIS, A CORPORATION OF ILLINOIS.

FILM-MAGAZINE FOR CAMERAS.

1,318,552.  Specification of Letters Patent.  Patented Oct. 14, 1919.

Original application filed March 1, 1918, Serial No. 219,797. Divided and this application filed June 14, 1918. Serial No. 240,076.

*To all whom it may concern:*

Be it known that I, VARIAN M. HARRIS, a citizen of the United States, residing at Chicago, in the county of Cook and State of Illinois, have invented a certain new and useful Improvement in Film-Magazines for Cameras, of which the following is a full, clear, concise, and exact description, reference being had to the accompanying drawings, forming a part of this specification.

This invention relates to combined motion picture camera and projector, and is especially concerned with improvements in the mechanism illustrated and described in my co-pending application Serial No. 195,040, filed October 6, 1917.

The objects of my present invention are:

1st. To simplify and improve in general the construction of the machine disclosed in my co-pending application above referred to.

2nd. To provide a novel magazine for holding the unexposed film and for receiving the film after it has been exposed, this magazine being of such construction as to permit daylight loading of the camera.

Figure 1:
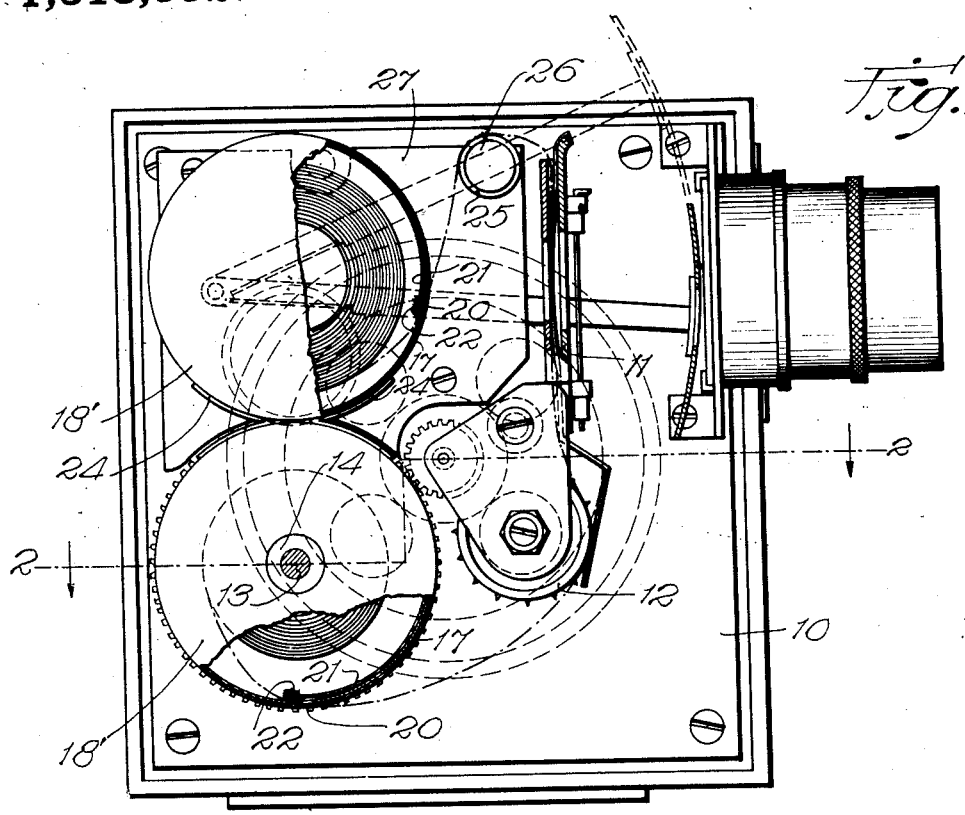

Other objects will definitely appear as the description progresses, reference being had to the accompanying drawings in which, Figure 1 is a side elevation of my improved camera with the cover removed showing my novel supply and take-up magazines in side elevation, portions of the closures of these magazines being broken away to better disclose the interior construction and the arrangement of the film in the magazines.

Figure 2:
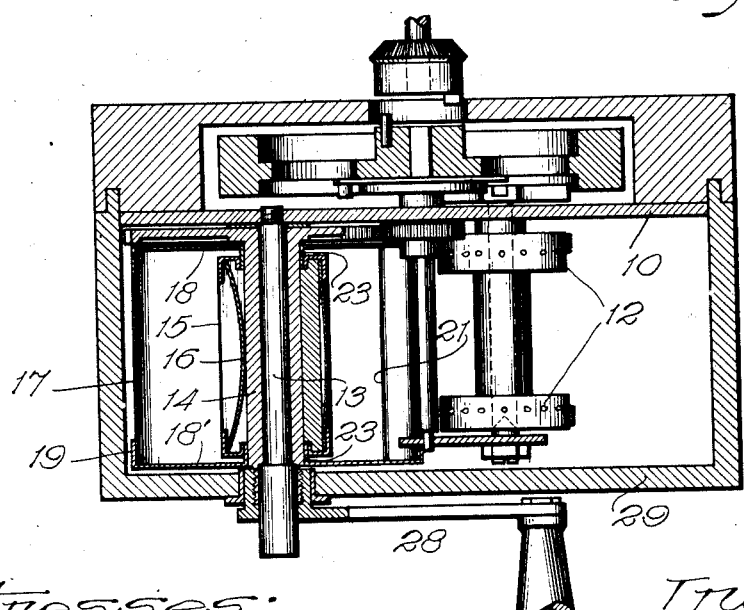

Fig. 2 is a transverse horizontal section taken on the broken line 2—2 of Fig. 1.

Similar characters of reference refer to similar parts throughout the several views.

This application is a division of my co-pending application Serial No. 219,797, filed March 1, 1918.

In the accompanying drawings I have illustrated only those portions of the structure illustrated and described in the application above referred to which are necessary to give a clear understanding of the relation between my improvements and the parts with which they coöperate in the prior structure.

Referring to the drawings, the reference character 10 indicates the frame plate upon which is mounted a film chute designated as a whole by the reference character 11. Rotatably mounted at the lower end of the film chute 11 are the sprocket wheels 12—12 which are driven through suitable mechanism, described in my applications above referred to, from the drive sleeve 14 to intermittently advance the film through the film chute 11. As the means for securing this intermittent motion form no part of my present invention they will not be described in detail. The drive sleeve 14 is rotatably mounted upon the post 13. Rotatably mounted upon the post 13 is a film spool 15 having a bowed spring 16 which engages with the outer surface of the sleeve 14 to provide a frictional drive between the sleeve 14 and the film spool 15, (for the purpose described in the application above referred to.) This spool is provided with suitable means for receiving the end of the film.

My improved supply and take-up magazines comprise a pair of cup shaped receptacles 17 provided with a pair of end closures 18 and 18', the closures 18 being formed integral with the side walls of the receptacle. The closures 18' are provided with flanges 19 which engage the sides of the receptacles and are detachably secured thereto by means of a pin and bayonet slot connection. This connection is not illustrated in detail as it is well known and for the further reason that I may employ any other means for detachably securing the closures 18' to the receptacles. Each of the receptacles is provided with a film slot 20 in the side thereof through which the film passes. These slots are provided with light traps in the form of resilient tongues 21 which are secured to the inner side of the receptacles at one end and provided with a layer of cloth 22, or other material, at the other end for sealing the slots against the entrance of light when the film is completely drawn into the magazines.

The upper receptacle shown in Fig. 1 constitutes the supply receptacle in which a roll of film is loosely placed without any support whatever, the roll of film merely lying loosely within the receptacle. The lower receptacle forms the take-up magazine and, as described above, is provided with a film spool having a frictional drive for taking up the film advanced through the film chute by the sprockets 12. Since the magazine 17 is supported by means of the sleeve 14 both end closures thereof are provided with central apertures and have inwardly extending flanges 23 which surround the central apertures and snugly engage the sleeve 14. These flanges are received in the ends of the film spool 15 to provide means for rendering the magazine light proof at the two points where the sleeve 14 passes through the end closures.

The take-up magazine is free to oscillate about the sleeve 14 and the supply magazine is secured to the upper side of the take-up magazine by means of the V shaped strips 24, the ends of which are soldered or otherwise secured to the sides of the magazines. As a result of this construction the supply magazine oscillates with the take-up magazine about the shaft 13 as an axis. The post 13, therefore, acts as a support for both the supply and take-up magazines.

It will be noted from an inspection of Fig. 1 that the film slot in the supply magazine is adjacent to the film chute and that the film leaves the supply magazine in a substantially tangential direction and passes about a roller 25 which is rotatably mounted upon a pin having an outer head 26, the inner end of said pin being riveted to the cover plate 27 which is supported in spaced relation to the frame plate 10, as described in my application above referred to. The film passes from the roller 25 into the film chute 11 in substantially the manner illustrated in Fig. 1.

By thus arranging the supply magazine to oscillate about the sleeve 14 between which and the supply magazine there is a slight frictional drag, due to the engagement of the flanges 23 with the ends of the film spool 15, and to the further fact that during the operation of the camera the crank 28 is rotated in a clockwise direction, the supply magazine tends to rotate in a clockwise direction about the post 13 and thereby places a slight amount of tension upon the film which causes the film to advance through the film chute without jerking. Furthermore, by mounting both the supply and take-up magazines upon the post 13 I provide a simplified and more compact structure and one from which it is comparatively easy to remove the magazine by simply removing the crank 28 and the cover 29, and then pulling the magazine outwardly.

While I have described the details of the preferred embodiments of my invention it is to be understood that they are not limited to these details, but include any other adaptations or modifications thereof within the scope of the appended claims.

Having thus described my invention what I claim as new and desire to secure by Letters Patent of the United States is:

1. A combination magazine for motion picture cameras comprising a pair of cup shaped receptacles, each having a film slot in the side thereof and a removable end closure, the bottom and end closure of one receptacle being provided with alined apertures and having inwardly extending flanges surrounding said apertures, a film spool rotatably mounted on said flanges, and means for supporting one of said receptacles upon the other of said receptacles.

2. A combination magazine for moving picture cameras comprising a pair of cup shaped receptacles, each provided with film slots in the side thereof and a removable end closure, of a light trap for each slot, and means for supporting one of said receptacles upon the other of said receptacles.

3. A combination magazine comprising a pair of receptacles permanently secured together side by side, each receptacle having a film slot in the side thereof provided with a light trap, and provided with a removable end closure.

4. A combination magazine for motion picture cameras, comprising a pair of receptacles, means for securing said receptacles together with their peripheries side by side, each receptacle being provided with a film slot in the side thereof, and having a removable end closure.

In witness whereof, I hereunto subscribe my name this 16th day of April, 1918.

VARIAN M. HARRIS.

Witnesses:
MARY A. COOK,
ALBIN COHLBERG.